United States Patent Office 3,235,503
Patented Feb. 15, 1966

3,235,503
LUBRICANT CONTAINING ALKYLENE POLY-
AMINE REACTION PRODUCT
Louis de Vries, Richmond, Calif., assignor, by mesne assignments, to Chevron Research Company, a corporation of Delaware
No Drawing. Filed Mar. 28, 1963, Ser. No. 268,600
3 Claims. (Cl. 252—51.5)

This invention relates to a novel alkylene polyamine reaction product. More particularly, the invention is concerned with a new alkylene polyamine reaction product of a succinic anhydride substituted high molecular weight unsaturated hydrocarbon polymer.

Dispersants have been added to lubricating oils to reduce the formation of sludge and varnish which tend to interfere with proper lubrication. For the most part, such dispersants have been metal organic compounds. Although the metal organic compounds have some effectiveness as dispersants, they are found to form ash deposits in the engine. These ash deposits lower the overall performance of the engine by fouling spark plugs and valves, and also contribute to preignition.

It has now been found that a useful new alkylene polyamine dispersant is provided in the alkylene polyamine reaction product of a maleic adduct of the copolymer of (A) α-olefins of from about 2 to about 20 carbon atoms and (B) polyolefins of from about 5 to about 20 carbon atoms in which the adducted maleic groups are reacted with an amino group of an alkylene polyamine, the amino group being nontertiary and the molar ratio of amine to adducted maleic groups being from about 0.25:1 to 2:1, said copolymer having at least 0.25% by weight of adducted maleic groups, a mole ratio of (A) monomer units to (B) monomer units from about 1:1 to about 400:1 and a molecular weight of from about 10,000 to about 1,000,000.

The alkylene polyamine derivative of this invention possesses valuable dispersing properties in liquid hydrocarbon compositions, such as fuels and lubricants. When added to lubricating oil compositions, the alkylene polyamine derivative also improves the viscosity-temperature characteristics of the compositions.

The alkylene polyamine product of this invention may also be described as the reaction product obtained by heating an alkylene polyamine with a succinic anhydride substituted copolymer containing (A) monomer units having the general formula

—RCH—CH$_2$— in which R represents hydrogen or an aliphatic essentially hydrocarbon radical of from about 1 to about 18 carbon atoms and mixtures thereof and (B) monomer units having the general formula

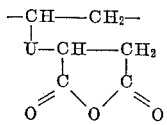

in which U represents an unsaturated aliphatic essentially hydrocarbon radical of from about 2 to about 18 carbon atoms, the ratio of (A) to (B) being from about 1:1 to about 400:1, said copolymer having a molecular weight of from about 10,000 to about 1,000,000, said succinic anhydride groups being reacted with an amino group of an alkylene polyamine, preferably a member of the class consisting of aliphatic and cycloaliphatic alkylene polyamines having from 2 to 10 amino groups linked by 1 to 9 divalent alkylene radicals containing from 2 to 6 carbon atoms each, the reacted amino group being nontertiary and the molar ratio of amine to succinic anhydride groups being from about 0.25:1 to 2:1.

Examples of alkylene polyamine reactants include ethylene diamine, diethylene triamine, dipropylene triamine, tetraethylene pentamine, pentaethylene hexamine, nonaethylenedecamine, dihexamethylene triamine, etc.

Alkylene polyamine reactants also include the alkyl-aminoalkylene amines of the formula

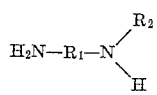

wherein $R_1$ is a divalent alkylene radical having from 2 to 6 carbon atoms, and $R_2$ is an alkyl radical of 1 to 8 carbon atoms. The sum of carbon atoms in $R_1$ and $R_2$ is preferably from 3 to 10.

The alkylene polyamines also include polyamines in which the amino groups are part of a ring structure as exemplified by an aminoalkyl piperazine of the formula

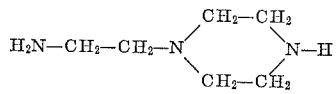

Polypiperazinyl alkylene polyamines containing as many as 5 piperazine units may also be used. Such compounds are suitably prepared by reacting amino groups of two different piperazine rings with a dihalo alkane, such as 1-bromo-3-chloropropane with the elimination of hydrogen halide.

The alkylene polyamine reacts with the succinic anhydride groups or succinic acid groups to form either amine salts, amides or imides or mixtures of such derivatives. Using alkylene amine (AA) by way of illustration, the reaction of a substituted succinic anhydride with an alkylene polyamine leads first to cleavage of the anhydride and formation of an acid amide. The acid moiety may form at the same time an amine salt as shown by the formula

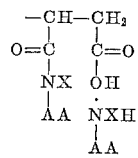

in which X is H, alkyl or AA; AA is (R′NH)$_n$—R′NH$_2$ in which R′ is a divalent alkylene radical of 2 to 6 carbon atoms and $n$ is a number from 0 to 8. Additional heating to temperature of 90–200° C. causes elimination of water and formation of N-alkylene polyamine imide, if X is H (primary amine). When X is alkyl or AA, the final product is a diamide.

An alternate synthesis route is the hydrolysis of the anhydride to the diacid; the latter, in the presence of amine, is first converted to the amine salt, then, upon moderate heating, to the mono- or di-amide, and after heating at higher temperature, to the imide (if the amine is primary).

The amine salts and amides form readily when the succinic anhydride substituted copolymer and alkylene polyamine are mixed together. Heating may be used to accelerate the reaction. In the case of the imide formation, heating is required. Suitable temperatures for this purpose are generally in the range from about 75° C. to about 250° C., preferably from about 90° C. to about 200° C.

The reaction of alkylene polyamine and succinic anhydride substituted copolymer is conveniently carried out at atmospheric pressures, although vacuum or higher pressures may be used to facilitate water removal or the maintenance of higher temperatures. Solvents for the reaction products are conveniently employed to simplify handling of materials and to assist in the control of the reaction conditions. Suitable solvents include the hydrocarbons such as petroleum naphtha fractions and aromatic hydrocarbons.

In the preparation of the alkylene polyamine compounds of this invention, it has been found desirable in some instances to form the Schiff base of the alkylene polyamine compounds before it is reacted with the maleic adduct or succinic anhydride substituted copolymer. By this method, undesirable side reactions, such as cross-linking and the formation of by-products may be substantially avoided. The Schiff base of the alkylene polyamine is prepared according to conventional means. For example, 2 moles of butyraldehyde are reacted with 1 mole of tetraethylene pentamine by mixing at room temperature. The Schiff base thus obtained is then mixed with the maleic anhydride adduct and heated to a temperature sufficient to decompose the Schiff base and form the amine salt, amide or imide, depending on the degree of heating as discussed above.

The alkylene polyamine reaction products of substituted succinic anhydride copolymers are generally characterized by a mixture of randomly distributed recurring component units having the schematic formula

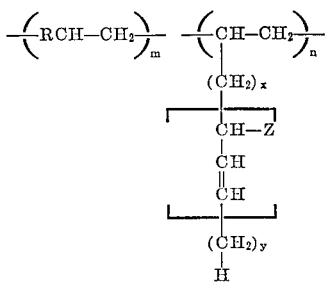

in which Z is an alkylene polyamine derivative of a succinic acid in which 1 to 2 alkylene polyamine groups are present as members of the class consisting of amine salts, amides and imides, the alkylene amine portion of said amine being selected from the class consisting of aliphatic and cycloaliphatic alkylene polyamines having from 2 to 10 amino groups linked by 1 to 9 divalent alkylene radicals containing from 2 to 6 carbon atoms each, R is selected from the class consisting of hydrogen and aliphatic hydrocarbon radicals of from about 1 to about 18 carbon atoms, $x$ is a number from 0 to 15 and $y$ is a number from 0 to 15, the total of $x$ and $y$ being from about 0 to 18, the ratio of $m$ to $n$ being from about 1:1 to about 400:1 and preferably from about 10:1 to about 100:1.

In the compounds of the invention as illustrated by the above and other formulae of this application, the double bond in the bracketed portions may occur either between the succinic group and the polymer backbone or between the succinic group and the end of the pendant hydrocarbon side chain.

The maleic abducting agent as shown in the illustrations of this invention is preferably maleic anhydride. However, other known agents may be used, such as maleic acid, monochloromaleic acid, monochloromaleic anhydride, and the like.

A preferred embodiment of the present invention consists of an oil-soluble polymeric dispersant containing a mixture of randomly distributed recurring component units having the formula

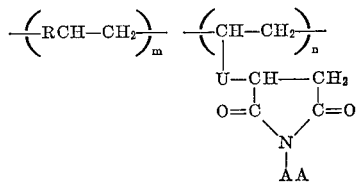

in which U represents an unsaturated aliphatic hydrocarbon radical of from about 4 to about 18 carbon atoms, AA is $(R'NH)_x$—$R'NH_2$ in which $R'$ is a divalent alkylene radical of 2 to 6 carbon atoms and $x$ is a number from 0 to 8, and R is hydrogen or an aliphatic hydrocarbon radical of from about 4 to about 18 carbon atoms, the ratio of $m$ to $n$ being from about 10:1 to about 100:1.

High molecular weight maleic anhydride adducts or succinic anhydride substituted hydrocarbon polymers useful in the preparation of the alkylene polyamine reaction products of this invention may be prepared from a variety of materials by several different methods. However, particularly suitable adducts and their preparation are described in detail in my copending application Serial No. 268,604, filed March 28, 1963. Generally described, such adducts are prepared by heating maleic anhydride together with a copolymer of α-olefins and polyolefins having an unsaturated group in the alpha position as already mentioned. In the adduction reaction, the maleic anhydride adds to the unsaturated hydrocarbon radicals which are pendant from the polymer backbone to give succinic anhydride groups. The temperatures of the adduction are ordinarily between about 100° C. and 300° C., preferably 150° C. and 250° C. The copolymer and maleic anhydride are heated together until the adduction is essentially complete as indicated by no further consumption of maleic anhydride. Usually from about 4 to 24 hours is sufficient. If desired the adduction may be carried out by other techniques, for example, by reaction of a chlorinated polymer containing about 1% by weight of chlorine, with maleic anhydride. Residual chlorine or other nonhydrocarbon substituent does not alter the essentially hydrocarbon character of the polymers as needed for oil solubility. On a weight basis the maleic anhydride adducts preferably contain an average of at least 0.25% of the resulting succinic anhydride groups.

The α-olefins in the copolymers contain at least 2 carbon atoms and include ethylene, 1-butene, 3-methyl-1-butene, 1-tetradecene, 1-octadecene, etc. The polyolefins have at least one terminal double bond and contain at least 5 carbon atoms, preferably at least 8, for example, 1,5-hexadiene, 1,9-octadecadiene, 1,4-octadiene, 1,9,12-octadecatriene, etc. Also included are cyclic olefins, such as cyclohexene, dicyclopentadiene, etc. The preferred copolymers are prepared by reacting the olefin mixtures in the presence of Ziegler-Natta type catalysts which have been found capable of providing satisfactory polymerization of α-olefins. Suitable catalysts and other general background for this type of polymerization reaction are described in a report entitled "Stereospecific Catalysis," beginning at page 93 in the journal "Chemical Engineering" for April 2, 1962 (McGraw-Hill Publishing Company, New York, New York).

The catalytic polymerization reaction employed in the preparation of the polymers is an addition type polymerization. The exact mechanism is still not known, but it is generally thought that stereospecific catalysts provide controlled propagation of the polymer chain from the monomers. This controlled propagation in the case of the present α-olefin monomer mixture results in a linear hydrocarbon chain having randomly mixed alkyl and alkenyl substituents on alternate carbon atoms as already discussed. For present purposes, the catalyst ordinarily involves the combination of a reducing metal compound with a reducible metal compound.

In the preparation of the copolymers from which the maleic anhydride adducts of the present invention are prepared, the preferred reducing compounds are aluminum compounds of the following formulae

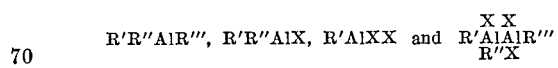

in which the three hydrocarbon radicals, R′, R″ and R‴ which may be the same or different, contain from 1 to 10 carbon atoms each and X's are halogens or mixtures thereof. Illustrative compounds are trimethyl aluminum, triphenyl aluminum, tribenzyl aluminum, phenyldiethyl aluminum, etc. The trialkyl aluminums having 2 to 6 carbon atoms in each alkyl group are most preferred from the standpoint of suitability and availability. The reducible metal compounds of the cocatalyst system used in the preparation of the copolymers is typically a metal of groups IV to VIII of the periodic system of elements, such as titanium, zirconium, vanadium, chromium, molybdenum, etc. Suitable compounds of such metals are the halides, the oxyhalides, the alcoholates, the carboxylic acid salts as illustrated by titanium tetrachloride, vanadium, oxychloride, chromium acetate, etc. The halide compounds are preferred, for example, titanium tetrachloride as well as the complex reaction product containing 3 moles of titanium trichloride to 1 mole of aluminum chloride.

The copolymerization is conveniently carried out at temperatures of from about 30° C. to about 150° C. at atmospheric pressure. The lower temperatures give copolymers of higher molecular weight. A hydrocarbon diluent, such as toluene, xylene, petroleum naphtha or mineral lubricating oil, is commonly employed. The diluent may also serve to some extent as a temperature control under reflux conditions. The reaction time is ordinarily from about 0.5 to 10 hours. When the polymerization reaction is completed to the desired extent, the reaction is stopped by quenching with an alcohol, such as isopropyl alcohol, thus deactivating the polymerization catalyst and incidentally precipitating the copolymer product from the inert hydrocarbon diluent. The copolymers as already mentioned are linear hydrocarbon chains having mixed alkyl and alkenyl substituents on alternate carbon atoms. They have molecular weights of at least about 10,000, preferably from about 50,000 to about 1,000,000 as determined by viscosity measurements and/or standard light scattering methods.

For present purposes, the preferred maleic anhydride adducts are derived from copolymers of cracked wax olefin mixtures of (A) α-olefins of from about 6 to about 20 carbon atoms and (B) polyolefins of from about 6 to 20 carbon atoms. Such cracked wax olefin copolymers are described in detail in my copending application Serial No. 248,212, filed December 31, 1962. The adducts of these copolymers have outstanding properties as lubricating oil additives and are useful in the preparation of still other superior additives for lubricants.

The cracked wax olefin mixtures are suitably prepared by thermal cracking of conventional refined paraffin waxes derived from typical waxy crude oils. Such waxes ordinarily consist of about 90% by weight of normal paraffins containing from about 16 to about 35 carbon atoms. The balance of the wax composition is made up of isoparaffins, napthenes and small proportions of aromatic hydrocarbons. Thermal cracking which is preferred since it produces high proportions of α-olefins is conveniently carried out by charging the paraffin wax to a reaction zone, such as a hot tube, usually at temperatures of about 500° C. to about 600° C. A few seconds per pass is usually sufficient. Conversions of about 30 to 35% per pass are ordinarily obtained. Atmospheric conditions are preferred, but either pressure of vacuum may be employed if desirable. Diluents such as steam may also be used in the cracking procedure.

The products from the cracking reaction include hydrogen, methane and other hydrocarbons containing as high as 35 carbon atoms. They are effectively separated by conventional means, such as fractional distillation. The lower boiling portion of the products including hydrocarbons of five or fewer carbon atoms may be used as a fuel or in gasoline blending. The portion containing hydrocarbons of more than 20 carbon atoms, if desired, may be recycled for further cracking. The $C_6$ to $C_{20}$ portion may be further fractioned into particular hydrocarbons having carbon contents of $C_{6-7}$, $C_{7-9}$, $C_{9-11}$, $C_{11-15}$, $C_{15-20}$ and the like.

Other paraffin wax charge stocks, cracking conditions and separation procedures of the abovementioned types are found in descriptions in various publications. The description in U.S. Patent No. 2,172,228 on "Process for the Manufacture of Olefins" is illustrative.

The analysis of a typical cracked wax olefin mixture indicates the following distribution of products:

| | Percent |
|---|---|
| Straight chain α-olefins | 89 |
| Straight chain α,ω-diolefins | 5 |
| Straight chain α-internal polyolefins | 1 |
| Branched-chain and naphthenic hydrocarbons | 3 |
| Conjugated internal diolefins, etc. | 2 |

In the ultimate alkylene polyamine reaction product, satisfactory oil solubility and detergency are generally obtained when the alkylene amine portion constitutes at least about 0.1 weight percent, preferably from about 4 to 50 weight percent, of the reaction product. Other polar groups, such as polyalkylene glycols may be present in amounts up to about 10% by weight, if desired, to provide supplementary characteristics.

Further illustration of the preparation of the alkylene polyamine reaction products of this invention are given in the following examples. The proportions are on a weight basis unless otherwise specified.

EXAMPLE 1

The preparation of maleic anhydride adduct of a Ziegler-Natta polymer of a mixture of cracked wax olefins is carried out. The olefins contain from 11 to 15 carbon atoms each. The mixture contains approximately 90% α-olefins and 6% polyolefins having at least one terminal double bond. The polymer has a molecular weight of about 300,000. 500 g. of the polymer is dissolved in 1200 g. cetane and heated for 20 hours at 420–440° F. with 4 g. of bis(dibutylhydroxyphenyl) methane and 140 g. maleic anhydride. After cooling down, the product is precipitated twice with acetone and twice with methylethylketone yielding a product having a viscosity at 210° F. of 70.4 (2.8% in 150 neutral oil) and a viscosity index of 139. The anhydride equivalent as determined by the intensity of the infrared absorption band at 1760 cm.$^{-1}$ is 4100. This corresponds to an approximate ratio of pendant alkyl groups to pendant alkenyl succinic anhydride of about 22:1 in the adduct. The "anhydride equivalent" is the number of grams of polymer which combine with 98 g. of maleic anhydride.

EXAMPLE 2

828 g. of a solution of maleic anhydride adduct in light lubricating oil containing 124 g. of the adduct is dissolved in 500 cc. of a low boiling petroleum solvent. The maleic anhydride adduct is the adduct of cracked wax olefin copolymer prepared as in the above example and has an anhydride equivalent of approximately 6200. The sample contains 0.02 maleic anhydride equivalent. 475 cc. of the solvent is removed by distillation to dry the polymer adduct. After cooling to room temperature, 8.22 cc. di-n-propylamine (0.06 mole) is added and the mixture is stirred at room temperature for ½ hour. After standing for a day, 1000 ml. of an aromatic hydrocarbon solvent is added. 124 ml. (0.95 mole) of N-aminoethyl piperazine is added at room temperature over a period of ¾ hour. The solution is heated to 177° C. and 640 ml. of solvent is removed. Water is removed by azeotroping at 177° C. for 19 hours. After cooling, the polymer reaction product is purified by precipitation three times from benzene with an acetone-methanol mixture. 1100 g. of light lubricating oil is added and the solvent is removed by distillation to 150° C. at a pressure of 2 mm. of mercury. 1225 g. of product is recovered, having a concentration of 10.2% polymer.

A sample of 150 neutral oil containing 2.8% of the polymer has a viscosity at 100° F. of 517 SSU and a viscosity at 210° F. of 85.7 SSU. The viscosity index equals 139. A sample of 1.5% of the polymer in the same base oil has a viscosity at 100° F. of 291 SSU, a viscosity at 210° F. of 59.4 SSU and a viscosity index of 136. The 150 neutral oil is a solvent refined California paraffin base oil having a viscosity of about 150 SSU at 100° F. and a viscosity index of about 85.

EXAMPLE 3

75 g. of a solution of a maleic anhydride adduct in light lubricating oil containing 15 g. of the said adduct is dissolved in 100 ml. of aromatic hydrocarbon solvent. The maleic anhydride adduct is the adduct of cracked wax olefin copolymer prepared as in the above examples and has an anhydride equilavent of approximately 3750. The sample contains 0.004 maleic anhydride equivalents. 2 ml. of di-n-propylamine (0.015 mole) is added and the mixture is stirred at room temperature for ½ hour to form the amine salt-amide of the maleic anhydride groups. In a separate vessel, 15 ml. diethylenetriamine (0.15 mole) and 30 ml. butyraldehyde (0.34 mole) are dissolved in a mixture of 50 ml. of xylene and 100 ml. of benzene. The mixture is stirred for ½ hour and filtered. This yields a Schiff base. The polymer solution and Schiff base solution are mixed and heated to 177° C. to remove aldehyde and solvent by distillation. After cooling, the solution is poured into methanol to precipitate the polymer, and this precipitate is washed with methylethylketone. It is redissolved in mixed hexane and precipitated twice more with acetone. 125 g. of light lubricating oil is added and the solvents are removed by distillation to 150° C. at a pressure of 2 ml. of mercury. 139.2 g. of product is recovered, having a polymer concentration of 10.2%.

2.8% of the polymer in 150 neutral oil gives a viscosity at 100° F. of 258 SSU, a viscosity at 210° F. of 55.2 SSU and a viscosity index of 132. 5.6% of the polymer concentrate in 150 neutral oil gives a viscosity at 100° F. of 476 SSU and a viscosity at 210° F. of 78.4 SSU, and a viscosity index of 136.

EXAMPLE 4

760 g. of solution of a maleic anhydride adduct in light lubricating oil containing 152 g. of the said adduct is dissolved in 1 liter of aromatic hydrocarbon solvent. The maleic anhydride adduct is the adduct of cracked wax olefin copolymer prepared as in the above examples and has an anhydride equivalent of approximately 3750. The sample contains 0.04 maleic anhydride equivalents. 20 cc. of di-n-propylamine (0.15 mole) is added and the mixture is stirred at room temperature for ¾ hour to form the amine salt-amide of the maleic anhydride groups. In a separate vessel, 150 ml. diethylenetriamine (1.5 moles) and 300 ml. butyraldehyde (3.4 moles) are dissolved in a mixture of 500 ml. of xylene and 1 liter of benzene. The mixture is stirred for about ½ hour and filtered. This yields a Schiff base. The polymer solution and Schiff base solution are mixed and heated to 177° C. to remove aldehyde and solvent by distillation. After cooling, the solution is poured into methanol to precipitate the polymer, and this precipitate is washed with methylethylketone. It is redissolved in mixed hexane and precipitated twice more with acetone. 1500 g. of light lubricating oil is added and the solvents are removed by distillation to 150° C. at a pressure of 2 ml. of mercury. 1635 g. of product is recovered, having a polymer concentration of 9.25%.

2.8% of the polymer in 150 neutral oil has a viscosity at 100° F. of 380 SSU, a viscosity at 210° F. of 68.6 SSU, and a viscosity index of 137.

EXAMPLE 5

75 g. of a solution of a maleic anhydride adduct in light lubricating oil containing 15 g. of the said adduct is dissolved in 150 ml. of an aromatic solvent. The maleic anhydride adduct is the adduct of cracked wax olefin copolymer prepared as in the above examples and has an anhydride equivalent of approximately 3750. The sample contains 0.004 maleic anhydride equivalent. 2 ml. of di-n-propylamine (0.015 mole) is added and the mixture is stirred at room temperature for 2 hours to form the amine salt-amide of the maleic anhydride group. In a separate vessel 27 ml. tetraethylene pentamine (0.14 mole) and 30 ml. butyraldehyde (0.34 mole) are dissolved in 150 ml. of benzene and stirred at room temperature for about ½ hour. The mixture is filtered. This yields a Schiff base. The polymer solution and the Schiff base solution are mixed and the benzene is removed by distillation. Distillation is then carried out at 177° C. for about 15 hours to remove the liberated aldehyde. After cooling, the solution is poured into methanol and the precipitated polymer is washed with methylethylketone, redissolved in mixed hexane and precipitated twice from the hexane with acetone. The polymer is then dissolved in benzene, and 135 g. of light lubricating oil is added. The solvent is removed by distilling to 150° C. under a pressure of 2 ml. of mercury. 149 g. of product is recovered having a polymer concentration of 9.4%.

A solution of 2.8% polymer in 150 neutral oil has a viscosity at 100° F. of 257 SSU, a viscosity at 210° F. of 55.4 SSU and a viscosity index of 134. A solution of 5.6% in 150 neutral oil has a viscosity at 100° F. of 548 SSU and a viscosity at 210° F. of 85.2 SSU and a viscosity index of 135.

EXAMPLE 6

795 g. of a solution of a maleic anhydride adduct in light lubricating oil containing 159 g. of the said adduct is dissolved in 1500 ml. of an aromatic hydrocarbon solvent. The maleic anhydride adduct is the adduct of cracked wax olefin copolymer prepared as in the above examples and has an anhydride equivalent of approximately 3750. The sample contains 0.042 maleic anhydride equivalent. 20 ml. of di-n-propylamine (0.15 mole) is added and the mixture is stirred at room temperature for 1 hour to form the amine salt-amide of the maleic anhydride group. In a separate vessel 270 ml. tetraethylene pentamine (1.4 moles) and 300 ml. butyraldehyde (3.4 moles) are dissolved in 1500 ml. of benzene and stirred at room temperature for about ½ hour. The mixture is filtered. This yields a Schiff base. The polymer solution and the Schiff base solution are mixed and the benzene is removed by distillation. Distillation is then carried out at 177° C. for about 15 hours to remove the liberated aldehyde. After cooling, the solution is poured into methanol and the precipitated polymer is washed with methylethylketone, redissolved in mixed hexane and precipitated three thimes from the hexane with acetone. The polymer is then dissolved in benzene, and 1780 g. of light lubricating oil is added. The solvent is removed by distilling to 177° C. under a pressure of 40 ml. of mercury. 1957 g. of product is recovered having a polymer concentration of 9.0%.

The following table gives engine data showing dispersant properties of lubricating oil compositions containing 2.5% of representation alkylene polyamine reaction products of this invention. The base lubricating oil is 150 neutral oil. It also contains a small amount of about 15 mM./kg. zinc butyl hexyl dithiophosphate, a conventional oxidation inhibitor.

The piston varnish ratings of the lubricant compositions are obtained by the standard FL–2 test procedure as set out in the June 21, 1948, report of the Coordinating Research Council. In this test the lubricants are run in a 6-cylinder Chevrolet engine, using a low-grade gasoline especially prone to cause engine deposits. At the end of each test the engine is dismantled and the detergency or deposition properties of the lubricant compositions are determined by examining the engine deposits on the piston and visually rating them as to the amount of piston varnish present. The piston varnish ratings of the compositions are given in numerical terms on a scale of 0–10 with "10" representing the complete absence of deposits. The base oil without alkylene polyamine reaction product has a piston varnish rating of 3.5.

*Table*

| Ex. No. | Additive | Piston varnish |
|---|---|---|
| 7 | N-aminoethyl piperazine imide of Ex. 2 | 7.7 |
| 8 | Diethylenetriamine imide of Ex. 4 | 7.2 |

As shown by the above characteristics, the alkylene polyamine reaction products of the invention when added to hydrocarbon compostions, such as mineral lubricating oils, provide excellent viscosity-temperature properties. They are also remarkably effective as dispersants for the prevention of harmful engine deposits as indicated by the improvement in piston varnish rating.

The alkylene polyamine products of this invention are oil soluble. This is intended to mean that they are soluble in conventional mineral lubricating oils and other oil compositions such as fuels in a concentration of alkylene polyamine product of at least about 0.1% by weight based on the total composition.

In the lubricating oil compositions of this invention, the alkylene polyamine product is used with lubricating oil base in amounts sufficient to raise the viscosity index and/or improve the detergency of the base lubricating oil. Ordinarily, amounts of alkylene polyamine product of from about 0.1% to about 15% by weight are satisfactory for both of these purposes. In view of the excellent solubility characteristics of the alkylene polyamine products, a further feature of the invention lies in the preparation of lubricating oil concentrates containing higher percentages of alkylene polyamine products up to about 75%.

The base oil in the lubricant composition of the invention is any oil of lubricating viscosity. Thus, the base oil can be a refined paraffin-type base oil, a refined naphthenic-type base oil, or a synthetic hydrocarbon or synthetic nonhydrocarbon oil of lubricating viscosity. As synthetic oils, suitable examples include oils obtained by polymerization of lower molecular weight alkylene oxides, such a propylene oxide and/or ethylene oxide employing alcohol or acid initiators, such as lauryl alcohol or acetic acid. Still other synthetic oils include esters, e.g., di-(2-ethylhexyl)-sebacate, tricresylphosphate and silicate esters, such as tetra-(2-ethylhexyl)-orthosilicate and hexa-(2-ethylbutoxy)-disiloxane. For present purposes the mineral lubricating oils are preferred, since they show the greatest viscosity and stability improvement.

Lubricant compositions within the scope of the present invention may also contain still other additives of conventional types, such as pour point depressants, oiliness and extreme pressure agents, anti-oxidants, dyes, blooming agents and the like.

Illustrative lubricant compositions of the aforementioned types containing additives other than the polymeric additive may include, for example, from about 0.1 to about 10% by weight of alkaline earth metal, higher alkyl phenate detergent and wear reducing agents such as the calcium alkylphenate having mixed alkyl groups of 12 to 15 carbon atoms. They may also include from about 0.1 to 10% by weight of organic thiophosphate corrosion and high-temperature oxidation inhibitors, such as the reaction product of pinene and $P_2S_5$, the reaction product of polybutene and $P_2S_5$, and the bivalent metal dihydrocarbon dithiophosphates, zinc, butyl amyl dithiophosphate and zinc di-(tetradecylphenyl) dithiophosphate. Metal salt detergents in amounts from about 0.1 to 10% which may also be used are the calcium petroleum sulfonates of the oil-soluble mahogany type and the calcium naphthenates.

As already mentioned, the high molecular weight alkylene polyamine products of this invention are useful in hydrocarbon fuels. In general, hydrocarbon base fuels customarily contain components such as cracked stocks which has a tendency to be unstable and thus form gum and deposits which clog filters and lines in fuel systems. Furnace oils, kerosenes, diesel fuel oils and jet fuels in particular contain substantial amounts of cracked gas oil stocks and form objectionable deposits during normal storage and operating conditions. The gum and deposit-forming tendencies of all such hydrocarbon base fuels are substantially eliminated by the addition of alkylene polyamine reaction product.

I claim:
1. A lubricating oil composition comprising a major proportion of an oil of lubricating viscosity and a minor proportion sufficient to improve the detergent characteristics of an oil-soluble polymeric dispersant consisting of a mixture of randomly distributed recurring component units having the formula

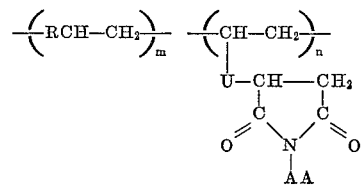

in which U represents an unsaturated aliphatic hydrocarbon radical of from 4 to about 18 carbon atoms, AA is derived from alkylene polyamine selected from the class consisting of aliphatic and cycloaliphatic alkylene polyamines having from 2 to 10 amino groups linked by 1 to 9 divalent alkylene radicals containing from 2 to 6 carbon atoms each, and R is a member of the group consisting of a hydrogen and an aliphatic hydrocarbon radical of from about 4 to about 18 carbon atoms, the ratio of $m$ to $n$ being from about 10:1 to about 100:1, said polymeric dispersant having a molecular weight of from about 50,000 to about 1,000,000.

2. A lubricating oil composition in accordance with claim 1 in which the group AA amine is derived from N-aminoethyl piperazine.

3. A lubricating oil composition in accordance with claim 1 in which the group AA amine is derived from diethylene triamine.

References Cited by the Examiner

UNITED STATES PATENTS

| 3,018,250 | 1/1962 | Anderson et al. | 252—51.5 |
| 3,024,237 | 3/1962 | Drummond et al. | 252—51.5 |

FOREIGN PATENTS 602,843  6/1948  Great Britain.

OTHER REFERENCES

Noller: Chemistry of Carbon Compounds (1951), W. B. Saunders Company, Philadelphia, Pa.

DANIEL E. WYMAN, *Primary Examiner.*